United States Patent
Chang et al.

(10) Patent No.: US 7,511,863 B2
(45) Date of Patent: **\*Mar. 31, 2009**

(54) SCANNING DEVICE AND METHOD FOR SAVING COMPENSATION MEMORY

(76) Inventors: Tom-Chin Chang, No. 22, Da-De Tsuen, Da-Pi Hsiang, HsinChu (TW); Kuo-Jeng Wang, No. 14, Kuang-An St., Fong-Kuang Li, Hsiao-Kang District, Kaohsiung (TW); Rong-Ji Liu, No. 3, Lane 442, Wen-Hsin Rd., Sec. 1, Taichung (TW)

( \* ) Notice: Subject to any disclaimer, the term of this patent is extended or adjusted under 35 U.S.C. 154(b) by 255 days.

This patent is subject to a terminal disclaimer.

(21) Appl. No.: 11/502,125

(22) Filed: Aug. 9, 2006

(65) Prior Publication Data

US 2006/0268370 A1 Nov. 30, 2006

Related U.S. Application Data

(63) Continuation of application No. 09/925,002, filed on Aug. 8, 2001, now Pat. No. 7,206,093.

(30) Foreign Application Priority Data

Jun. 8, 2001 (TW) .............................. 90113920 A

(51) Int. Cl.
*H04N 1/04* (2006.01)
*H04N 1/393* (2006.01)
*G06K 9/32* (2006.01)

(52) U.S. Cl. .................. 358/474; 358/494; 358/426.05; 358/451; 358/482; 382/299

(58) Field of Classification Search ................ 358/1.16, 358/406, 471, 482–483, 504, 474, 494, 426.05, 358/451; 382/274, 299; 250/208.1
See application file for complete search history.

(56) References Cited

U.S. PATENT DOCUMENTS

| | | |
|---|---|---|
| 4,760,464 A | 7/1988 | Sakano |
| 6,324,344 B1 | 11/2001 | Otsuka |
| 6,559,981 B1 | 5/2003 | Aoki |

*Primary Examiner*—Edward L Coles
*Assistant Examiner*—Charlotte M Baker
(74) *Attorney, Agent, or Firm*—Stolowitz Ford Cowger LLP

(57) ABSTRACT

A method of reducing memory requirement in the compensation memory unit of a scanner. The method includes providing an even compensation data value and an odd compensation data value and averaging the two to produce an odd-even compensation data value. Only half as much memory space is required to hold the averaged odd-even compensation data values.

15 Claims, 2 Drawing Sheets

SCANNING DEVICE AND METHOD FOR SAVING COMPENSATION MEMORY

CROSS-REFERENCE TO RELATED APPLICATIONS

This is a Continuation Patent Application of U.S. patent application Ser. No. 09/925,002, filed Aug. 8, 2001 issued as U.S. Pat. No. 7,206,093, which claims the benefit of foreign priority under 35 USC §119(a) to Taiwan, R.O.C. Application Ser. No. 90113920, filed Jun. 8, 2001.

BACKGROUND OF THE INVENTION

1. Field of Invention

The present invention relates to a scanning device and a scanning method. More particularly, the present invention relates to a scanning device and a scanning method capable of saving some compensation memory.

2. Description of Related Art

Due to rapid development of multi-media systems, there is a demand for images with a higher resolution. To increase image resolution, the number of light-sensitive cells (such as charge coupled device (CCD)) in the sensing device of a scanner must increase correspondingly.

Because of some intrinsic properties of a charge-coupled device (CCD) or manufacturing deviation, sensitivity of each CCD cell may not be identical. Hence, before scanning an object, the scanner must perform a light-intensity calibration to produce a set of shading values so that image compensation can be conducted subsequently. Any non-uniform light-intensity effects in the pixels generated by the CCD can be compensated for using the shading values. Ultimately, color of the pixel and the color on the target object are identical. To use the shading values in image compensation, the shading values need to be stored in compensation RAM units inside the scanning device. As resolution of a scanner increases, the number of pixels in a CCD increases correspondingly. Since a larger compensation memory must be used to store up the shading values required to compensate the light-intensity of a scanned image, production cost of a scanner increases.

SUMMARY OF THE INVENTION

Accordingly, one object of the present invention is to provide a device and a method of saving compensation memory for holding shading values in a scanner. The shading values are divided into odd shading values and even shading values. The odd and the even shading values are averaged to produce an odd-even shading value. Two consecutive sets of image pixels obtained through a charge-coupled device (CCD) use the same odd-even shading values for image compensation. With this arrangement, only half of the conventional compensation memory in a scanner is required.

To achieve these and other advantages and in accordance with the purpose of the invention, as embodied and broadly described herein, the invention provides a compensation memory saving scanning device. The device includes an input device, an application-specific integrated circuit, a compensation memory unit, an image memory unit and an input/output interface. The application-specific integrated circuit couples with the input device, the compensation memory unit, the image memory unit and the input/output interface.

Even data values and odd data values are input to the application-specific integrated circuit via the input device. After performing a computation using the even data values, the odd data values and preset values, the application-specific integrated circuit averages out the even compensation values and the odd compensation values to produce averaged odd-even compensation values. The averaged odd-even compensation values are stored inside the compensation memory unit. Scanned pixel data are stored inside the image memory unit before outputting to the input/output interface.

This invention also provides a scanning method capable of saving some compensation memory. First, even compensation values necessary for compensating even-numbered pixels and odd compensation values necessary for compensating odd-numbered pixels are extracted. The even compensation values and the odd compensation values are averaged to produce averaged odd-even compensation values.

Compensation values necessary for compensating an image must be stored inside a compensation memory unit. To save some compensation memory space, odd compensation values and even compensation values are averaged to produce half as much even-odd compensation values so that only half of the memory is required to hold the data.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
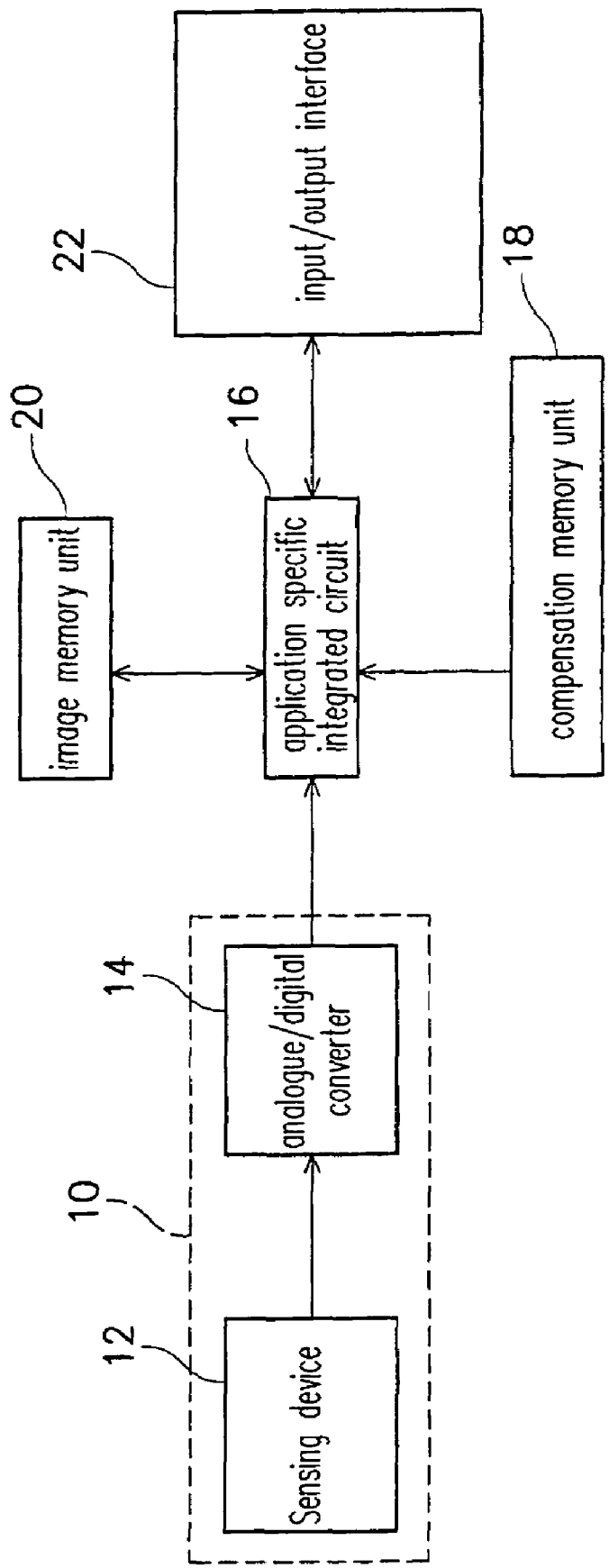
FIG. 1 is a block diagram showing a scanning device capable of saving compensation memory according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing a scanning device capable of saving compensation memory according to one preferred embodiment of this invention. As shown in FIG. 1, the scanning device includes an input device 10, an application-specific integrated circuit 16, a compensation memory unit 18, an image memory unit 20 and an input/output interface 22. The input device 10 further includes a sensing device 12 and an analog/digital converter 14.

The sensing device 12 couples with the analog/digital converter 14. The analog/digital converter 14 couples with the application-specific integrated circuit 16. The compensation memory unit 18, the image memory unit 20 and the input/output interface 22 all couple with the application-specific integrated circuit 16.

Figure 2:
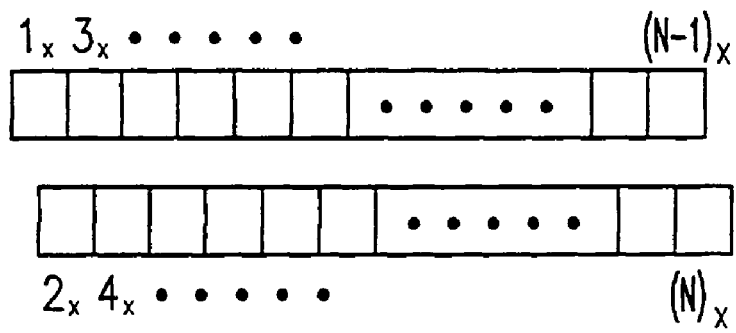
FIG. 2 is a schematic diagram of an alternative-sensing device for holding compensation data according to one preferred embodiment of this invention.
Figure 3:
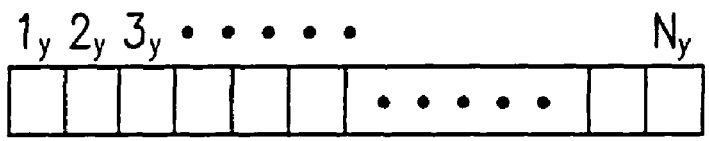
FIG. 3 is a schematic diagram of a linear-sensing device for holding compensation data according to one preferred embodiment of this invention.

FIG. 2 is a schematic diagram of an alternative-sensing device for holding compensation data according to one preferred embodiment of this invention. In this embodiment, the alternative-sensing device of FIG. 2 may be used as the sensing device 12 of FIG. 1. Before the scanning device scans an image object, a compensation procedure is performed. In general, white is used as a compensation color. When the scanning device is conducting a compensation procedure, CCD cells 1×.about.N× (FIG. 2) of the sensing device 12 of FIG. 1 will convert the sensed light intensity into respective currents and transfer to the storage electrodes for producing signal charges. The charges are then transformed to appropriate voltage differential. The alternative-sensing device uses such procedure to perform an alternate scanning of the compensation white so that a multiple of alternative scanning pixels are output to the analog/digital converter 14 of FIG. 1. In addition, a linear sensing device similar to the one shown in FIG. 3 may also be used as the sensing device 12 of FIG. 1.

As the analog/digital converter 14 of FIG. 1 receives the alternately scanned image pixels, alternate scanned pixels in an analog format are digitized into even data values and odd data values. Thereafter, the even data values and the odd data values are transferred to the application-specific integrated circuit 16 of FIG. 1.

The application-specific integrated circuit 16 of FIG. 1 receives the even data values and the odd data values. After performing a computation using the even data values, the odd data values and preset values, the application-specific integrated circuit 16 of FIG. 1 averages out the even compensation values and the odd compensation values to produce averaged odd-even compensation values. The averaged odd-even compensation values are stored inside the compensation memory unit 18 of FIG. 1. For example, when one of the even 2×CCD cells and one of the odd 1×CCD cells scan an image pixel, optical data are converted into an even data value=250 and an odd data value=262 via the analog/digital converter. The application-specific integrated circuit 16 of FIG. 1 receives both the even data value and the odd data value. Inside the application-specific integrated circuit 16 of FIG. 1, a preset value=255 is subtracted from the even value data=250 to produce an even compensation value=−5. Similarly, a preset value=255 is subtracted from the odd value data=262 to produce an odd compensation value=7. Thereafter, the even compensation value and the odd compensation value are averaged ((even compensation value=−5+odd compensation value=7)/2) to produce an averaged odd-even compensation value=1. Finally, the averaged odd-even compensation value is transferred to the compensation memory unit 18 of FIG. 1. In this embodiment, compensation white is used as color compensation. Hence, the preset value is 255.

After performing the compensation procedure, the scanning device starts to scan an object document. The even 2×CCD cells and the odd 1×CCD cells scan image pixels and the optical data are converted into even data values and odd data values by the analog/digital converter 14 of FIG. 1. The resultant data values are transferred to the application-specific integrated circuit 16 of FIG. 1. At this stage, the averaged odd-even compensation value=1 is retrieved from the compensation memory unit 18 of FIG. 1. After adding the averaged odd-even compensation value to the even data value and the odd data value, a pair of image values is output to the image memory unit 20 of FIG. 1. The odd and even image values reside in the image memory unit 20 of FIG. 1 until they are required by the input/output interface 22 of FIG. 1. When such moment arrives, the application-specific integrated circuit 16 of FIG. 1 reads out the pair of image values from the image memory unit 20 of FIG. 1 and sends them to the input/output interface 22 of FIG. 1.

Figure 4:
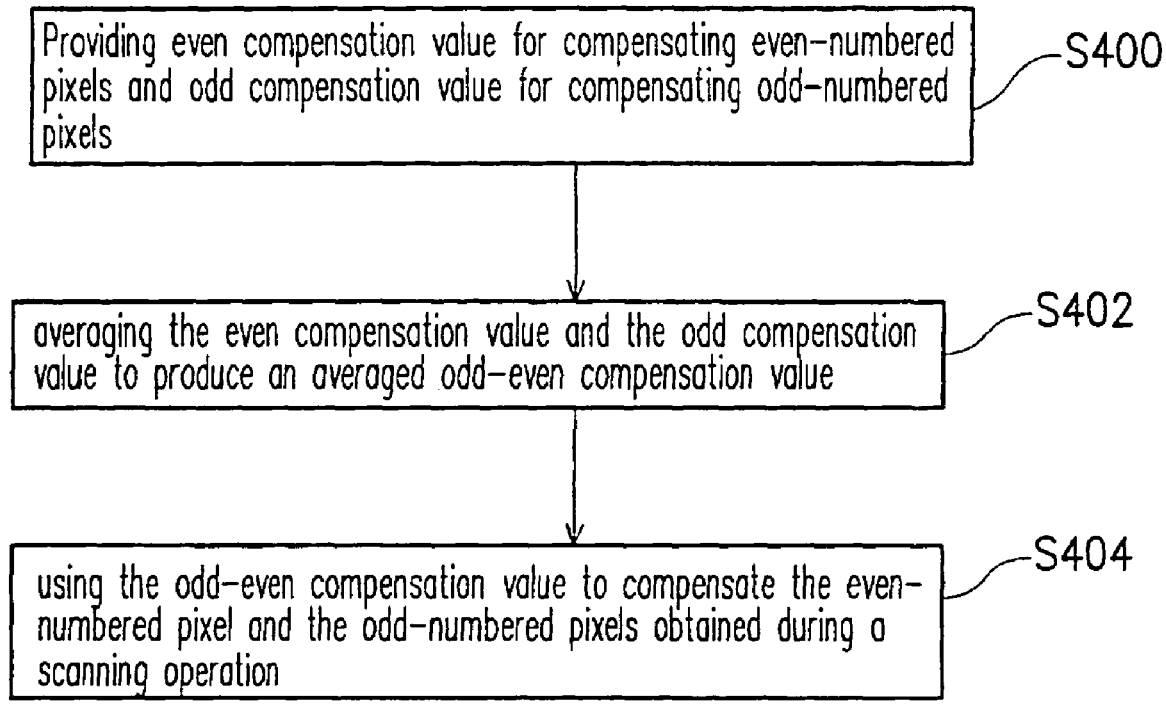
FIG. 4 is a flow diagram showing the scanning method for saving some compensation memory according to one preferred embodiment of this invention.

According to the flow described in FIG. 1, a flow diagram showing the scanning method for saving some compensation memory is produced in FIG. 4. As shown in FIG. 4, step S400 is executed to provide an even compensation value and an odd compensation value. Step S402 is executed to average out the even compensation value and the odd compensation value and produce an averaged odd-even compensation value. Finally, step S404 is executed using the averaged odd-even compensation value to compensate for the values obtained from even pixel position and odd pixel position during a scanning operation.

In this invention, compensation values are split up into odd compensation values and even compensation values. The odd and even compensation values are then averaged to produce an averaged odd-even compensation value. Since a pair of CCD cells uses the same odd-even compensation value after each scanning operation, memory capacity required for compensation data storage is cut in half.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An application-specific integrated circuit having stored thereon instructions that, when executed, result in:
   receiving an even data value obtained from an even-numbered pixel of a scanner and an odd data value obtained from an odd-numbered pixel of the scanner;
   performing a computation using the even data value, the odd data value, and a preset value to produce an even compensation value and an odd compensation value; and
   averaging the even compensation value and the odd compensation value to produce an averaged odd-even compensation value.

2. The application-specific integrated circuit of claim 1, wherein the averaged odd-even compensation value is further produced substantially by a process, comprising:
   employing an alternative-sensing device to perform a plurality of alternate scanning operations on a document and sequentially obtain a plurality of alternatively scanned pixels; and
   employing an analog/digital converter coupled to the alternative-sensing device to digitize the alternately scanned pixel data in analog format into even data values and odd data values.

3. The application-specific integrated circuit of claim 1, wherein the averaged odd-even compensation value is further produced substantially by a process, comprising:
   employing a linear sensing device to perform a plurality of linear scanning operations on a document and sequentially obtain a plurality of linearly scanning pixels; and
   employing an analog/digital converter coupled to the linear sensing device to digitize the linearly scanned pixel data in analog format into even data values and odd data values.

4. An apparatus, comprising:
   means for receiving an even compensation value for compensating an even-numbered pixel and an odd compensation value for compensating an odd-numbered pixel;

means for generating an odd-even compensation value based, at least in part, on the even compensation value and the odd compensation value; and means for compensating an even-numbered pixel value and an odd-numbered pixel value by employing the odd-even compensation value.

5. The apparatus of claim 4, further comprising:

means for obtaining values associated with a plurality of alternately scanned pixels; and means for digitizing the alternately scanned pixel values into even data values and odd data values.

6. The apparatus of claim 4, further comprising:

means for combining the odd-even compensation value with the even-numbered pixel value and the odd-numbered pixel value.

7. An article comprising a storage medium having stored thereon instructions that, when executed, result in:

performing a computation using an even data value obtained from an even-numbered pixel of a scanning device, an odd data value obtained from an odd-numbered pixel of the scanning device, and a preset value to produce an even compensation value and an odd compensation value;

generating an odd-even compensation value based, at least in part, on the even compensation value and the odd compensation value; and compensating an even-numbered pixel value and an odd-numbered pixel value of the scanning device by using the odd-even compensation value.

8. The article of claim 7, wherein the instructions, when executed, further result in:

performing a plurality of alternate scanning operations on a document to sequentially obtain a plurality of alternately scanned pixels; and digitizing the alternately scanned pixel data in analog format respectively into even data values and odd data values.

9. The article of claim 7, wherein said generating the said odd-even compensation value further comprises generating the odd-even compensation value based, at least in part, on an average of the even compensation value and the odd compensation value.

10. A computer-readable medium having instructions stored thereon, wherein when the instructions are executed by a processing device, the instructions are operable to:

receive an even compensation value for compensating an even-numbered pixel and an odd compensation value for compensating an odd-numbered pixel;

generate an odd-even compensation value based, at least in part, on the even compensation value and the odd compensation value; and use the odd-even compensation value to compensate an even-numbered pixel value and an odd-numbered pixel value obtained from a scanner.

11. The computer-readable medium of claim 10, wherein the instructions are further operable to:

obtain values from the scanner corresponding to a plurality of alternately scanned pixels; and digitize the alternately scanned pixel values respectively into even data values and odd data values.

12. The computer-readable medium of claim 10, wherein the instructions are further operable to:

compensate the even-numbered pixel value and the odd-numbered pixel value by adding a corresponding odd-even compensation value to the even-numbered pixel value and the odd-numbered pixel value.

13. The computer-readable medium of claim 10, wherein the odd-even compensation value is generated based, at least in part, on an average of the even compensation value and the odd compensation value.

14. A method, comprising:

receiving a shading value obtained from a compensation procedure for an even-numbered pixel and an odd-numbered pixel of a scanner;

producing an odd-even shading compensation value by use of the even-numbered pixel shading value and the odd-numbered pixel shading value; and performing shading compensation for an even-numbered pixel value and an odd-numbered pixel value obtained from the scanner based, at least in part, on the odd-even shading compensation value.

15. The method of claim 14, further comprising:

obtaining values from the scanner associated with a plurality of alternately scanned pixels; and digitizing the alternately scanned pixel values into even data values and odd data values.

* * * * *

UNITED STATES PATENT AND TRADEMARK OFFICE
CERTIFICATE OF CORRECTION

PATENT NO. : 7,511,863 B2  Page 1 of 1
APPLICATION NO. : 11/502125
DATED : March 31, 2009
INVENTOR(S) : Chang et al.

It is certified that error appears in the above-identified patent and that said Letters Patent is hereby corrected as shown below:

At column 5, line 38, please replace "generating the said" with --generating the--.

Signed and Sealed this

Fifteenth Day of June, 2010

David J. Kappos
*Director of the United States Patent and Trademark Office*